United States Patent
Duhan

[15] 3,642,120
[45] Feb. 15, 1972

[54] CONVEYING APPARATUS AND METHOD

[72] Inventor: Frederick William Duhan, Philadelphia, Pa.

[73] Assignee: Crown Cork & Seal Company, Inc., Philadelphia, Pa.

[22] Filed: July 28, 1969

[21] Appl. No.: 845,156

[52] U.S. Cl. ............................198/203, 74/216.5, 74/231 R
[51] Int. Cl. ...........................................................B65g 23/00
[58] Field of Search............198/203, 184, 131; 74/231 R, 74/229, 216.5

[56] References Cited

UNITED STATES PATENTS

| | | | |
|---|---|---|---|
| 2,074,595 | 3/1937 | Shackelford | 198/203 |
| 2,639,025 | 5/1953 | Schmitt | 198/184 |
| 3,414,123 | 12/1968 | Litt et al. | 198/131 |

Primary Examiner—Richard E. Aegerter
Assistant Examiner—Douglas D. Watts
Attorney—Woodcock, Washburn, Kurtz & Mackiewicz

[57] ABSTRACT

An endless conveyor belt is carried by driving and driven pulleys having belt-engaging peripheries comprising, alternately, planar and curved surfaces. Flexure of a seam of the belt and consequent breakage of the belt is avoided by causing the belt in the vicinity of the seam to be engaged by one of the planar surfaces.

12 Claims, 7 Drawing Figures

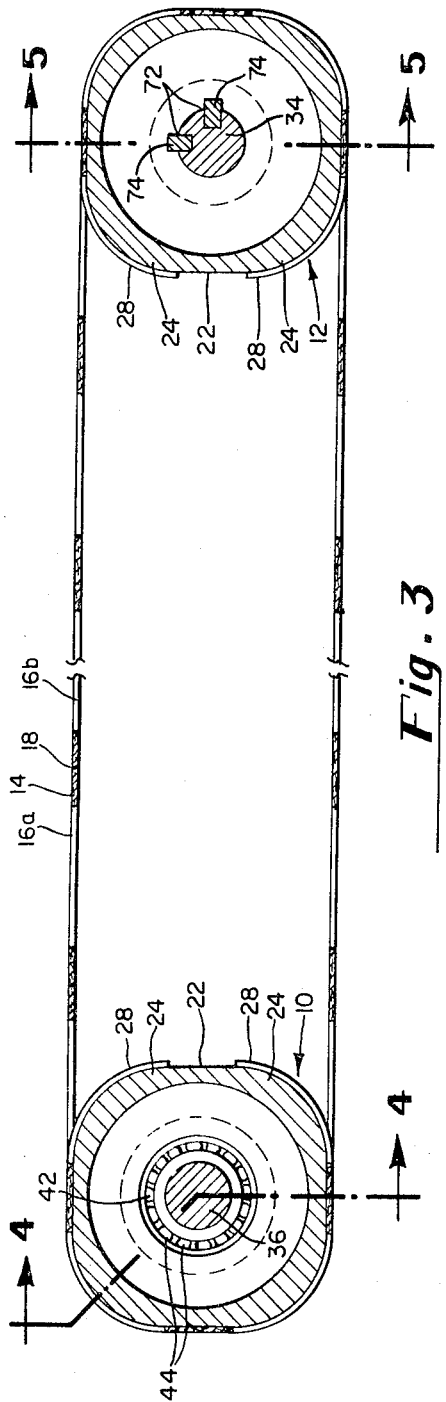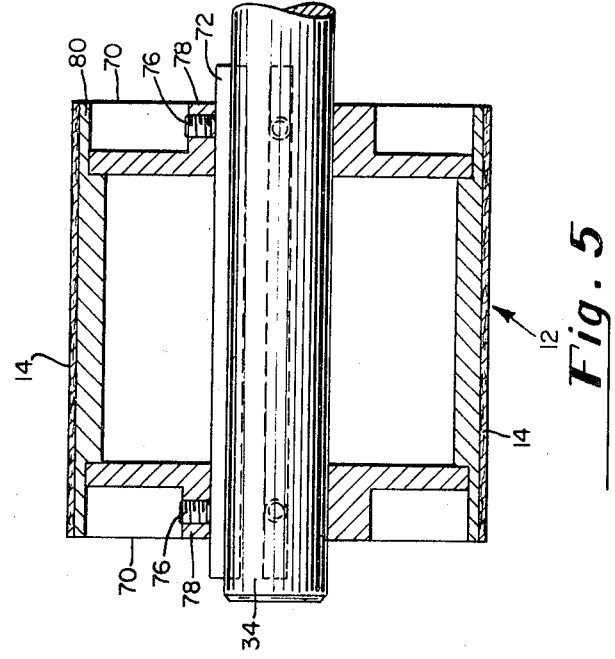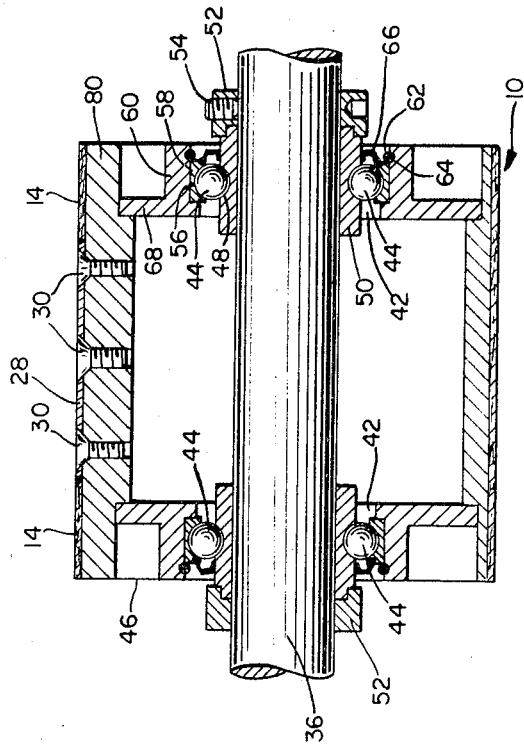

//<br>
CONVEYING APPARATUS AND METHOD

BACKGROUND OF THE INVENTION

This invention relates to a conveying apparatus, and more particularly, to a conveying apparatus comprising a conveyor belt.

Any endless belt which passes over and around a pulley is of necessity subjected to a certain amount of repeated flexure since a segment of the belt, prior to reaching the pulley, will be substantially planar but the same segment, after reaching the pulley will be forced to bend around the pulley during revolution of the belt. Any additional pulleys around which the belt passes increase the incidence of flexure. While repeated flexure is hard on any belt and contributes to failure by causing a breakage of the belt, it is particularly hard on an endless belt having a seam extending across the belt. Such a seam usually provides a weakness in the belt even without flexure. When such a seam is repeatedly flexed, the additional strain placed upon the relatively weak seam hastens the breakage of the belt which inevitably occurs at the seam.

In the past, efforts have been made to reduce breakage of a belt along a seam by strengthening the belt rather than by reducing or eliminating flexure. One of the principles of proper belt construction emerging from these efforts has been the concept of providing a seam of maximum length which decreases the tension per unit length of the seam. In accordance with this principle, it has been a common practice to provide a diagonal seam along a belt rather than a strictly lateral seam across the belt. By doing so, the tension per unit length of the seam is decreased and the flexure of the belt by a pulley extends along, as opposed to across, the seam thereby reducing the frequency of breakage at the seam. However, the use of article retaining means and/or drive means for advancing the belt frequently impose limitations on the use of a diagonal seam.

SUMMARY OF THE INVENTION

It is an object of this invention to prevent breakage of a conveyor belt.

It is a further object of this invention to prevent breakage of a conveyor belt by preventing flexure of the belt in the vicinity of a seam.

It is a further object of this invention to prevent breakage of a conveyor by providing a strong seam.

In accordance with these objects, there is provided a method of preventing flexure of a conveyor belt at a seam thereof by maintaining a portion of the belt in the vicinity of the seam substantially planar during engagement with a pulley.

In further accordance with these objects, there is provided an apparatus comprising at least one pulley for assisting in the transport of the belt having one or more not substantially convex faces, the portion of the belt in the vicinity of the seam being juxtaposed to the one or more faces to prevent flexure at the portion of the belt in the vicinity of the seam.

In still further accordance with these objects, there is provided an apparatus comprising an endless belt and a pair of revolving pulleys. The endless belt has a row of apertures adapted to receive articles and a seam located in the portion of the belt between two of the apertures. Each of the revolving pulleys includes a plurality of substantially planar faces adapted to engage the belt at the seam and a plurality of protruding faces positioned between the planar faces and adapted to extend into the apertures in driving relation therewith.

BRIEF DESCRIPTION OF THE DRAWINGS

FIG. 3 is a cross-sectional view of the conveying apparatus taken along section line 3—3 of FIG. 1;
FIG. 4 is a cross-sectional view of one pulley of the conveying apparatus taken along section line 4—4 of FIG. 3;
FIG. 5 is a cross-sectional view of a pulley of the conveying apparatus taken along section line 5—5 of FIG. 3.

DESCRIPTION OF THE PREFERRED EMBODIMENT

Figure 1:
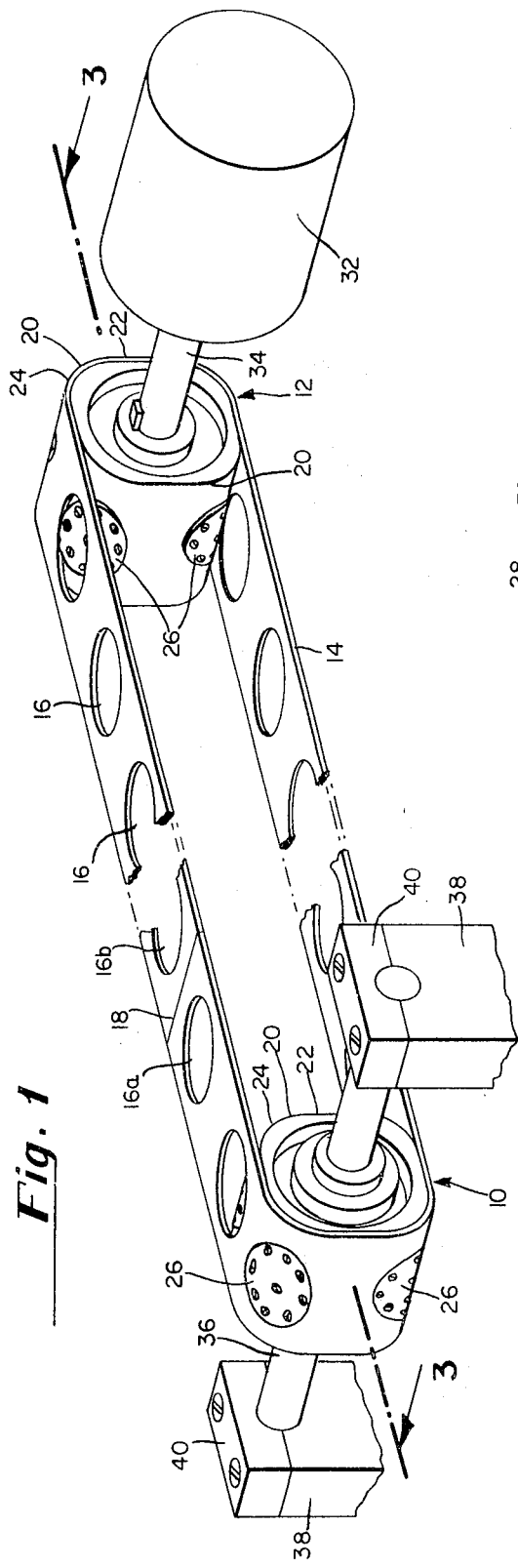
FIG. 1 is a perspective view of a conveying apparatus.

Referring to FIG. 1, there is disclosed a conveying apparatus capable of intermittently feeding a plurality of articles along to a plurality of work stations where sequential operations are performed on each of the articles. More particularly, there is disclosed a pair of spaced pulleys 10 and 12 for transporting an endless feeding or conveyor belt 14.

The belt 14 is characterized by a plurality of equally spaced apertures or holes 16 arranged in a series or row extending longitudinally along the belt 14. When the apertures 16 are substantially circular as shown, the belt 14 is well adapted to carry beer can ends through a plurality of work stations in a press to form ring pull tabs thereon. The belt 16 is further characterized by a lateral, welded seam 18 joining two portions of the belt between apertures 16a and 16b so as to provide the belt 14 with an endless configuration. Since the belt 14 must be of substantially constant length to achieve the appropriate registration of the apertures 16 and thus the articles carried therein with the various work stations, belt 14 comprises a substantially nonstretchable material. Stainless steel has been found to be preferable although other materials may be utilized.

Each of the pulleys 10 and 12 is characterized by a periphery having a plurality of substantially identical planar faces 22 and a plurality of substantially curved or arcuate faces 24 positioned between the planar faces 22 in a uniform alternating pattern of planar and curved faces. The curved faces 24 carry sprockets 26 which are appropriately circumferentially spaced at 90° intervals so as to engage the equally spaced apertures 16. Accordingly, a portion of the belt in the vicinity of the apertures 16 are always engaged by the curved portions of the periphery 20 provided by the curved faces 24 while the portion of the belt in the vicinities between the apertures 16, such as between the apertures 16a and 16b, are always engaged by planar portions of the periphery 20 as provided by the planar faces 22.

Figure 2:
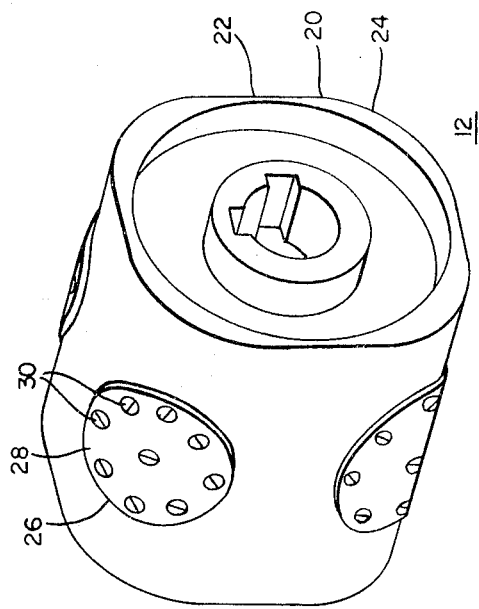
FIG. 2 is a perspective view of a pulley of the conveying apparatus.

As may be seen by referring to FIG. 2 where the pulley 12 is shown, the sprockets 26 comprise discs 28 which are bent around the curved faces 24 midway across the pulley periphery 20. Once bent around the faces 24, the discs 28 are held in the necessary curved configuration conforming to the curved faces 24 by fastening means in the form of screws 30.

By providing pulleys 10 and 12 having substantially planar faces 22, those portions of the belt 14 engaged only by the planar faces 22 will not be flexed by the pulleys 10 and 12 as they pass therearound. And by placing the sprocket disc 28 on the curved faces 24 and thereby forcing engagement of those portions of the belt in the vicinities of the apertures 16 by the curved faces 24, those portions of the belt 14 between the apertures 16 will be forced into engagement with the planar faces 22. Consequently, those portions of the belt between the apertures 16, and in particular between the apertures 16a and 16b, will be maintained in a planar condition and never be flexed. Since the seam 18 is located between the apertures 16a and 16b, a portion of the belt which is never flexed, the seam 18 will never be flexed and one very significant cause of belt breakage is eliminated.

Not only is flexure of the seam 18 avoided to prevent breakage of the belt, but by establishing a long continuous seam 18 across the full width of the belt 14 which is unbroken by apertures 16 or any other apertures, the maximum strength for the belt is provided.

An intermittent drive means in the form of a Ferguson drive mechanism 32 is provided to assure the appropriate intermittent advancement and indexing of the articles carried in the apertures 16 with the various stations. A driven shaft 34, coupling the driving pulley 12 and the drive mechanism 32, intermittently rotates the pulley 90° to intermittently advance the belt a distance equal to the distance between the centers of the apertures 16a and 16b or any other two adjacent apertures 16. Simultaneously, the driven or idler pulley 10 which is rotatably mounted upon a fixed shaft 36 rigidly secured to support blocks 38 by screw-mounted caps 40 also intermittently rotates 90°.

The rotatable mounting for the pulley 10, as shown in FIGS. 3 and 4, comprises an annular raceway 42 for bearings 44 at each end 46 of the pulley 10. One bearing surface is provided by a groove 48 in a ring 50 which is secured to the shaft 36 by a collar 52 having a setscrew 54. The other bearing surface is provided by a groove 56 in a ring 58 which is secured to a flange 60 of a ring 68 by a wire-retaining ring 62 inserted into a notch 64. A wipe ring 66 closes each raceway 42 at the outer edge thereof.

The driven mounting for the pulley 12, as shown in FIGS. 3 and 5, is characterized by a keyed coupling between each end 70 of the pulley 12 and the shaft 34. The shaft 34 includes a pair of keys 72 secured with an angular relationship of 90° and extending radially outwardly therefrom into a pair of keyways 74 also having a 90° relationship therebetween. The keys 72 which may be integral with the shaft 34 or separable therefrom are held in place by setscrews 76 inserted through apertures in a flange 78 of the ends 70.

In order to achieve the appropriate contour for each of the pulleys 10 and 12 along the periphery 20; i.e., an alternating pattern of planar and flat faces 22 and 24, the ends 46 and 70 are provided with a variable radial thickness. Beneath those portions of a rim 80 which form the planar faces 22 along the periphery 20, the ends 46 and 70 have a minimum radial thickness. Beneath those portions of the rim 70 which form the curved faces 24 along the periphery 22, the ends 46 and 70 have a maximum radial thickness. When the rim 70 which has a substantially constant radial thickness is secured to the ends 46 and 70 by appropriate means such as welding, the periphery 20 will have the desired pattern of alternating planar and curved surfaces.

Although the periphery 20 of the pulleys 10 and 12 has been shown as comprising an alternating pattern of curved and planar faces, it is not imperative that the invention be so embodied in the pulleys which are utilized to transport a conveyor belt. Rather, it is only necessary that the pulleys have a periphery including portions adapted to be juxtaposed to a seam which are not substantially convex. For example, if the planar faces 22 were provided with a depression so as to render them substantially convex, or if the faces 22 were completely removed and the belt merely contacted the convex faces 24, the seam of the endless belt would still remain unflexed as long as the seam was juxtaposed with that portion of the pulley periphery which was not substantially convex.

Further modifications at the periphery 20 of the pulleys 10 and 12 are also possible in connection with the drive portions of the periphery 20. In particular, the drive portions in the form of protruding curved faces 24 as provided by the blunt sprocket plates 28 having an arcuate cross section might be eliminated by substituting smaller, more numerous, and generally more conventional sprockets around the periphery 20 of the pulleys 10 and 12. For example, it is possible to provide a row of sprockets near one of the ends 46 and 70 of the pulleys 10 and 12 along the entire periphery 20 including the planar faces 22. Of course, this necessitates providing for mating sprocket holes in the endless belt 14. If the mating sprocket holes are sufficiently closely spaced, the seam 18 will of necessity either pass through one of the sprocket holes or be so close to one of the sprocket holes so as to weaken the seam itself. Even so, the invention might still be practiced by providing the smaller more conventional sprockets with the smaller more conventional sprocket holes without sacrificing the important object of eliminating flexing of a belt at the seams thereof.

However, where an endless belt is utilized and it is desirable to eliminate flexure, it is important to provide the proper relationship between the overall loop length of the endless conveyor belt, the peripheral length of a pulley having a not substantially convex face, and the number of such not substantially convex faces. The appropriate relationship between these factors may be expressed as $$L=P(n+1/m)$$

Where
$L=$ loop length of the endless belt
$P=$ peripheral length of a pulley having a not substantially convex face
$n=$ any integer, and
$m=$ the total number of faces which are not substantially convex.

By utilizing this relationship, it will be seen that the seam of the endless belt will always engage one of the not substantially convex faces.

Both of the pulleys 10 and 12 have been specified as comprising four planar faces 22 separated by four-curved faces 24. However, it is not necessary that the pulleys 10 and 12 comprise four planar faces and four curved faces or an even number of planar faces and an even number of curved faces. Furthermore, it is not necessary that more than one pulley which has a face which may be characterized as not substantially convex be utilized since avoidance of flexing at only one pulley in a conveyor apparatus will substantially reduce the amount of flexing at a seam in an endless belt. For example, in a two pulley system, the use of a single pulley having a face not substantially convex and so adapted to be juxtaposed to the seam of an endless belt will reduce the incidence of flexure at the seam of that belt by 50 percent. Similarly, the use of a single pulley having a not substantially convex face in a three pulley system will reduce the incidence of flexure at the seam of an endless belt by 33 percent. Thus, it will be seen that neither the number of faces which are not substantially convex nor the number of pulleys in a conveyor system is particularly critical in practicing and deriving the benefits of this invention.

Not only have means been provided in the foregoing specification for preventing breakage of a conveyor belt at a seam thereof, but in addition, a particular method of preventing breakage has been set forth. The method entails the prevention of flexure of the belt 14 at the seam 18 by maintaining the portion of the belt in the vicinity of the seam 18 substantially planar as the belt 14 passes around the pulleys 10 and 12. This is accomplished by limiting the necessary flexure of the belt 14 as the belt passes around the pulleys 10 and 12 to a portion of the belt remote from the seam 18 and in the vicinity of the apertures 16 in general and 16a and 16b in particular. Or restated, the seam 18 is engaged by planar faces 22 and therefore not flexed and the apertures 16 are engaged by curved faces 24 and therefore flexed.

Figure 6:
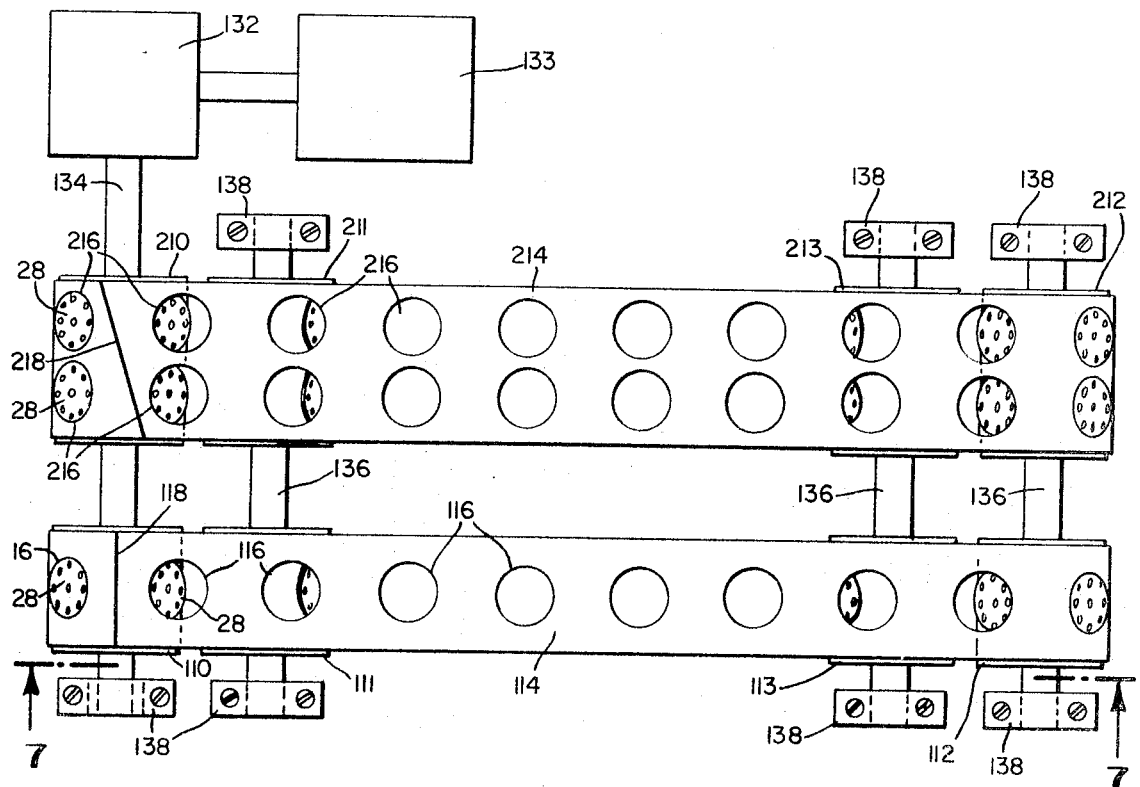
FIG. 6 is a top plan view of a particular conveying system.
Figure 7:
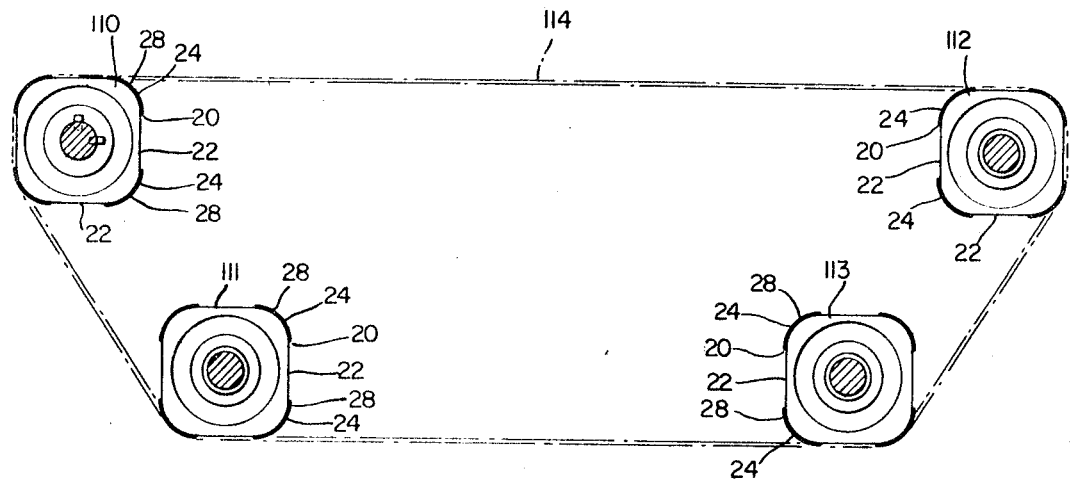
FIG. 7 is a cross-sectional view of the system of FIG. 6 taken along section line 7—7.

A two-belt, eight-pulley system relying on the invention to prevent belt breakage is shown in FIGS. 6 and 7. One of the two belts, belt 114, is substantially identical to the belt 14 and includes a laterally extending seam 118 between two of a single series of holes 116. The belt 114 is driven around a drive pulley 110 and an idler or takeup pulley 112 which are substantially identical to the drive pulley 10 and the idler pulley 12 respectively having peripheries 20 including planar faces 22 and arcuate faces 24 with sprocket discs 28. Additional idler pulleys 111 and 113 also having peripheries 20 including faces 22 and arcuate faces 24 with sprocket discs 28 are provided. Since all of the pulleys including the idler pulleys 111–113 have planar faces 22 which exclusively engage the seam 118, the utmost advantage is taken of the invention thereby reducing the incidence of belt breakage.

The other of the two belts 214 is similar to the belt 14 but has two side-by-side series of holes 216 and a diagonally extending seam 218 between two adjacent holes in each of the series for additional strength in the belt 214. The belt 214 is carried on and driven around a drive pulley 210 and idler pulleys 211, 212, and 213. In order to take full advantage of the invention, all of the pulleys 210–213 have peripheries including alternate planar and arcuate faces with side-by-side sprocket discs 28 identical to the planar faces 22 and the arcuate faces 24 respectively of the pulleys 110–113 and in identical mutually relative positions.

In order to drive the belts 114 and 214 intermittently so as to sequentially present articles carried in holes 116 and 216 to one or more work stations, an intermittent drive mechanism such as a Ferguson unit 132 and a continuously running motor 133 mechanically coupled thereto are provided. The unit 132 intermittently rotates a drive shaft 134 in a bearing block 138. By fixedly mounting or keying the pulleys 110 and 210 on the shaft 134, the shaft 134 may drive the pulleys 110 and 210 along with the belts 114 and 214. The idler pulleys 111–113 and 211–213 are mounted on idler shafts 136 which are supported by blocks 138. Preferably, the pulleys 111–113 and 211–213 are freely rotatable on the shafts 136 so as to reduce the load on the intermittent drive mechanism.

It should be understood that the invention and many of its attendant advantages will be understood from the foregoing description and it is thought that it will be apparent that various changes may be made in the form, construction, and arrangement of the structure disclosed without departing from the spirit and scope thereof or sacrificing all of its material advantages, the embodiment of the invention in that structure hereinbefore described being merely illustrative.

What is claimed is:

1. A conveyor apparatus comprising:
at least one pulley having a plurality of equally circumferentially spaced sprockets and a plurality of surfaces which are not substantially convex between respective pairs of said sprockets; and
an endless conveyor belt having a plurality of equally spaced serially arranged apertures adapted to be engaged by said sprockets and only having a seam between serially adjacent apertures of said serially arranged apertures, each seam in said belt only being juxtaposed to said plurality of surfaces as said belt is transported around said pulley to substantially eliminate flexure of said belt at said seam.

2. The apparatus of claim 1 wherein each of said plurality of surfaces is substantially planar.

3. The apparatus of claim 2 wherein said equally circumferentially spaced sprockets are the only sprockets on said pulley and said equally spaced serially arranged apertures are the only apertures engaged by said sprockets.

4. The apparatus of claim 2 wherein said planar surfaces are sprocketless.

5. The apparatus of claim 4 wherein said sprockets comprise protruding curved surfaces.

6. The apparatus of claim 5 wherein said protruding curved surfaces comprise curved plates and said pulley comprises curved portions on either side of each of said planar surfaces with said plates mounted on said curved portions.

7. A conveyor means comprising:
an endless belt having a row of apertures adapted to carry articles and a seam joining two portions of said belt between two of said apertures, and
a pair of spaced revolving pulleys cooperating with said belt, each of said pulleys including a plurality of substantially planar faces adapted to engage said belt at said seam to avoid flexing thereat and a plurality of curved protruding faces positioned between said planar faces and adapted to extend into said apertures in driving relation therewith.

8. The conveyor means of claim 7 wherein said protruding faces comprise plates having an arcuate cross section.

9. The conveyor means of claim 8 wherein said pulleys have an even number of substantially planar faces and an even number of substantially protruding faces.

10. The conveyor means of claim 8 wherein said apertures are substantially circular.

11. A conveyor apparatus comprising an endless conveyor belt having a plurality of equally spaced serially arranged apertures and having a seam between two serially adjacent apertures and further comprising at least one pulley for transporting said belt having a plurality of equally circumferentially spaced sprockets adapted to engage said apertures and having a surface which is substantially planar between two of said sprockets, said surface being juxtaposed to said seam as said belt is transported around said pulley to limit flexure of said belt at said seam, said sprockets comprising plates and said pulley further having curved portions on either side of said planar surface with plates mounted on said curved portions.

12. Means for intermittently advancing articles through a plurality of work stations comprising:
an endless belt including a row of equally spaced apertures adapted to carry articles and including a seam joining two portions of said belt between two of said apertures, and
a pair of spaced revolving pulleys cooperating with said belt, each of said pulleys including a periphery having a plurality of substantially identical planar faces and a plurality of substantially identical curved faces engaging said endless belt, said planar faces being positioned between said curved faces to provide a uniform alternating pattern of planar and curved faces about said periphery, each of said pulleys including a plurality of blunt sprockets comprising curved plates having sufficient thickness and appropriate size to mate with spaced apertures, said sprockets being secured to respective curved faces at equally circumferentially spaced positions on said curved faces for sequential engagement of said endless belt at said spaced apertures and engagement of said seam on one of said planar faces.

* * * * *